(12) United States Patent
Tanaka

(10) Patent No.: US 6,821,608 B2
(45) Date of Patent: Nov. 23, 2004

(54) WATER-RESISTANT CORRUGATED CARDBOARD AND PALLET THAT UTILIZES IT

(75) Inventor: Keiji Tanaka, Kyoto (JP)

(73) Assignee: Tanakaya, Inc., Kyoto (JP)

( * ) Notice: Subject to any disclaimer, the term of this patent is extended or adjusted under 35 U.S.C. 154(b) by 0 days.

(21) Appl. No.: 10/194,399

(22) Filed: Jul. 12, 2002

(65) Prior Publication Data

US 2004/0009332 A1 Jan. 15, 2004

(51) Int. Cl.⁷ .................................................. C08J 5/10
(52) U.S. Cl. ....................... 428/174; 428/178; 428/181; 428/184; 428/355 R; 428/355 AK
(58) Field of Search ................................. 428/174, 178, 428/179, 181, 184, 355 R, 355 AK, 182, 183, 185, 186; 524/44

(56) References Cited

U.S. PATENT DOCUMENTS 6,083,580 A * 7/2000 Finestone et al. .......... 428/34.2
6,255,369 B1 * 7/2001 Philbin et al. ................ 524/47

\* cited by examiner

*Primary Examiner*—Harold Pyon
*Assistant Examiner*—Alicia Chevalier
(74) *Attorney, Agent, or Firm*—Jeffrey F. Craft

(57) ABSTRACT

To provide practical corrugated cardboard pallets that cope with rain, humidity or the like and water-resistant corrugated cardboard for use as the material thereof. Water-resistant paper is used for base paper for corrugated paperboard and base paper for flat paperboard, and cornstarch glue containing 7 to 10 percent by weight modified ketone resin is used as an additive for water-resistance, all of which are used to manufacture the corrugated cardboard. Such corrugated cardboard is used at least in the beam portion to produce a pallet.

3 Claims, 4 Drawing Sheets

Planar compression

| Time elapsed | Sample 1 | Sample 2 | Sample 3 | Sample 4 |
|---|---|---|---|---|
| 1 min. | | | OK | OK |
| 2 min. | | | Complete exfoliation | Starting exfoliation |
| 3 min. | | | | Collapse (2 minutes 45 seconds) |
| 10 min. | OK | OK | | |
| 20 min. | OK | OK | | |
| 30 min. | OK | OK | | |
| 1 h | OK | OK | | |
| 1.5 h | OK | OK | | |
| 2 h | OK | Complete exfoliation | | |
| 3 h | OK | | | |
| 4 h | OK | | | |
| 5 h | OK | | | |
| 6 h | OK | | | |
| 7 h | OK | | | |
| 8 h | OK | | | |
| 22 h | OK | | | |
| 23 h | OK | | | |
| 24 h | OK | | | |
| 72 h | OK | | | |

\* OK: No exfoliation, crushing or significant change in dimensions
Complete exfoliation: Exfoliation of at least part of the pasted or piled portion
Collapse: Falling of the piles, complete crushing of the tier and/or the like

Fig. 4

Perpendicular compression

| Time elapsed | Sample 1 | Sample 2 | Sample 3 | Sample 4 |
|---|---|---|---|---|
| 1 min. | | | OK | OK |
| 2 min. | | | OK | OK |
| 3 min. | | | Collapse (2 minutes 26 seconds) | OK |
| 4 min. | | | | Starting exfoliation |
| 5 min. | | | | Complete exfoliation |
| 6 min. | | | | |
| 7 min. | | | | |
| 10 min. | OK | OK | | |
| 20 min. | | OK | | |
| 30 min. | OK | OK | | |
| 1 h | OK | OK | | |
| 1.5 h | OK | OK | | |
| 2 h | OK | OK | | |
| 14 h | OK | OK | | |
| 15 h | OK | OK | | |
| 16 h | OK | Complete exfoliation | | |
| 17 h | OK | | | |
| 18 h | OK | | | |
| 19 h | OK | | | |
| 20 h | OK | | | |
| 21 h | OK | | | |
| 22 h | OK | | | |
| 23 h | OK | | | |
| 24 h | OK | | | |
| 72 h | OK | | | |

Fig. 5

WATER-RESISTANT CORRUGATED CARDBOARD AND PALLET THAT UTILIZES IT

BACKGROUND OF INVENTION

1. Field of the Invention

This invention relates to water-resistant, corrugated cardboard. Such corrugated cardboard, for example, can be utilized for all-weather pallets and containers.

2. Discussion of the Related Art

Most pallets used for transportation, carriage or the like in various places such as factories, airports and/or seaports are conventionally made of wood, and some are made of plastic or steel. However, there have been such problems, as follows, if they are made of any such materials.

Because pallets are usually transported to the destination together with loads placed on them, they are frequently brought into foreign countries. In such a case, some countries require that the wooden pallets be quarantined by fumigation or the like, just like imported animals and plants. Such quarantine periods, which usually take a considerable length of time, often cause problems for trading, which requires quick action.

It is therefore conceivable to use pallets made of plastic or steel. However, the former causes problems in disposal. The latter substantially raises the freight cost, especially if the goods to be loaded are rather light, since the shape and size of the pallet necessary for use make the pallet considerably heavy.

Taking the aforementioned matters into consideration, the pallets made of corrugated cardboard are considered to be most suitable for the exportation of light-weight goods. However, the biggest problem with pallets made of normal corrugated cardboard is that the strength is reduced by water adhesion such as rain or moisture absorption.

SUMMARY OF THE INVENTION

This invention, which was made for the purpose of solving the above described problem, provides practical pallets made of corrugated cardboard, which can cope with rain or moisture, and water-resistant corrugated cardboard as the material for such pallets.

The water-resistant corrugated cardboard of this invention, which was created in order to solve the aforementioned problem, is characterized by water-resistant paper that is used for corrugated paperboard and flat paperboard, which are glued together with cornstarch glue containing 7 to 10 percent by weight modified ketone resin.

First of all, water-resistant paper is used for corrugated paperboard and flat paperboard, which are the main materials for the water-resistant, corrugated cardboard of this invention. Though various types of water-resistant papers are on the market, the one whose size "Cobb size" is larger than that of the conventional corrugated cardboard paper is desirable for use in corrugated cardboard. For this purpose, the strength of the paper itself (initial strength) increases yet its strength is less reduced by rain. Needless to say, the amount of moisture absorption is so little that the strength is not reduced if it is used or kept in the environment that is high in humidity.

Next, for the glue to join the corrugated paperboard and the flat paperboard, one having water-resistance and/or humidity-resistance is used. However, a large amount of glue is needed to manufacture corrugated cardboard, which must remain cost-competitive by comparison with the wooden pallet. There are plenty of types of glues, many of which are water-resistant, but there has been no such kind of glue as to be cheap enough for corrugated cardboard. Thus, the inventor of this invention came up with the idea that the cornstarch glue presently used for corrugated cardboard could be used as the base and additive with a water-resistant element added to it, and therefore various experiments were repeatedly conducted. As a result, the inventor discovered that the modified ketone resin adds sufficient water-resistance to cornstarch glue while keeping the cost increase to a minimum. The suitable volume to be added is 7 to 10 percent by weight. If it is less than this, there will not be enough water resistance. If more volume is added, the liquidity of cornstarch glue becomes insufficient, causing difficulty in the cardboard manufacturing process.

BRIEF DESCRIPTION OF THE DRAWINGS

FIG. 4 is a table showing changes in the corrugated cardboard block under planar compression over time.

FIG. 5 is a table showing changes in the corrugated cardboard block under perpendicular compression over time.

DETAILED DESCRIPTION OF THE PREFERRED EMBODIMENT

Figure 1:
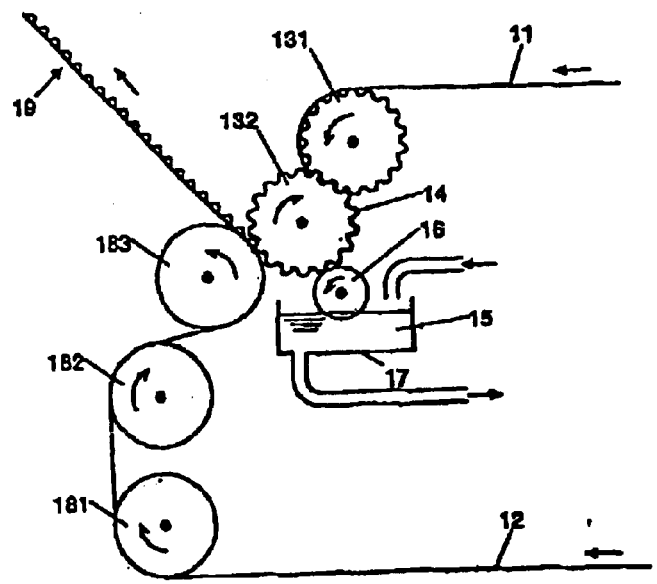
FIG. 1 is a schematic representation showing an example of the manufacturing process of the one-sided corrugated cardboard of this invention.

An example of the manufacturing process for the water-resistant corrugated cardboard (one-sided corrugated cardboard) of this invention is described according to FIG. 1. In this embodiment, a water-resistant center-core base paper is used for both base paper 11 for corrugated paperboard (center-core) and base paper 12 for flat paperboard (liner). The property of such an embodiment is as follows:

Material specifications
    Raw material: Corrugated cardboard waste paper
    Chemical name: Cellulose
        Polyacrylamide
Classification of danger and hazard
    Danger: Flammable
    Toxicity: None
    Influence on the environment: The biodegradability is considered good.
Physical and chemical nature: Density=0.65, pH=5.5 to 6.5; no bad smell; insoluble in water; heavy metals not detected in elution testing.
Caution for disposal: It should be a recyclable resource. It is possible to treat as burnable waste.

| | |
|---|---|
| Indicated basic weight: | 180 g/m$^2$ |
| Measured basic weight: | 178.4 g/m$^2$ |
| Thickness: | 0.291 mm |
| Density: | 0.613 g/cm$^3$ |
| Compressive strength (horizontal): | 263 N (26.8 kg) |

-continued

| | |
|---|---|
| Tensile strength (vertical): | 9.5 kN/m (14.55 kg/15 mm) |
| Breaking length (vertical): | 5.43 km |
| CMT: | 347 N (35.4 kg) |
| Moisture (at time of manufacture): | 8.1% |
| Size (Cobb size): | 24 g/cm$^3$ |
| (On-reel humidification measuring device: 23° C. 50% RH, humidification for four hours or more | |

A roll of base paper 11 for corrugated paperboard and a roll of base paper 12 for flat paperboard are set in the supply reel (not shown in the drawings). The base paper 11 for corrugated paperboard is shaped as it passes between the two corrugated rollers 131 and 132, which engage each other and rotate. The top of the corrugations of the corrugated paperboard 14 thus formed is contacted with the roller 16, to whose surface the reinforced cornstarch glue 15 is adhered, so that the reinforced cornstarch glue 15 is applied to the top of the corrugations. The lower portion of the roller 16 is dipped into the reinforced cornstarch glue 15, which is kept to a certain level in the container 17.

The first manufacturing process of the reinforced cornstarch glue 15 is as follows: First, 57 kg of cornstarch and 2 kg of borax are thrown into 195 L (liter) of water and sufficiently stirred, whereby the main portion is formed. Then, 18 kg of cornstarch and 2.7 kg of caustic soda are thrown into 180 L of water and sufficiently stirred, whereby the carrier portion is formed. The main portion and carrier portion are mixed and 7 to 10 percent by weight of the additive for water-resistance is added thereto. For such a water-resistant additive, an aqueous adhesive whose base is modified ketone resin can be used. The following explains the special property of "AICA AIBON VL-3340," a product of AICA Kogyo Co. Ltd., as an example.

| Ingredients and amounts contained | |
|---|---|
| Modified ketone resin and/or the like: | 30 to 40% |
| Urea/melamine resin and/or the like: | 20 to 30% |
| Water: | 30 to 50% |
| Physical/chemical nature: | Soluble in water |

(The information above is based on the product-safety data sheet (MSDS)).

The modified ketone resin, which is the base of the aforementioned water-resistant additive, is contained and used in surface coating agents such as lacquer or paint, ink, nail polish and the like for the purpose of improving gloss and weather-resistance, given that it offers excellent adhesion and plasticity. It is also used as "stickiness" agent for glues made of resin and is said to be effective for improving the adhesive power of a resinous adhesive base.

The second manufacturing process of the reinforced cornstarch glue 15 is as follows: First, 17 kg of cornstarch is thrown into 90 L of water and stirred for five minutes. An aqueous solution made from 3.0 kg of caustic soda dissolved into 10 L of water is added thereto and stirred for 30 minutes to make a carrier portion. Further, 108 kg of cornstarch is thrown into 310 L of water and stirred for five minutes to make the main portion. The carrier portion and main portion are mixed, 2.5 kg of borax is thrown in, and the mixture is stirred for 60 minutes. Then, 8.95 L of additive for water resistance is added and the mixture is stirred for 40 minutes. As for the water-resistant additive, as in the first manufacturing process as mentioned above, an aqueous adhesive whose base is modified ketone resin can be used.

It should be noted that the viscosity required for the reinforced cornstarch glue 15 is not uniform but varies in accordance with such conditions as the weather at the time of manufacture and the machinery being used. Accordingly, it is desirable to adjust the amounts of the aforementioned ingredients and the time needed for stirring in accordance with the required viscosity.

The base paper 12 for flat paperboard passes through the smooth rollers 181 and 182 and is glued atop the corrugations of the aforementioned corrugated paperboard 14 between the third smooth roller 183 and the corrugated roller 132. Both of the two corrugated rollers 131 and 132, and the three smooth rollers 181 to 183 are so heated that both the corrugated paperboard 14 and the flat paperboard 12 will become about 100 to 130° C. in temperature at the time the paper 14 and the paper 12 are glued between the smooth roller 183 and the corrugated roller 132. Consequently, the cornstarch ingredient of the reinforced cornstarch glue 15 between the paper 14 and the paper 12 is coagulated in a few seconds. The paper 14 and the paper 12 are pasted to become one-sided corrugated cardboard 19.

The one-sided corrugated cardboard 19 thus manufactured is cut into an appropriate size. The required number of cut cardboard pieces is piled according to the necessary strength. In piling, glue is applied atop the corrugations of the aforementioned corrugated paperboard 14 of the one-sided corrugated cardboard 19. For the case in which a large number of sheets of corrugated cardboard is piled, the glue used for piling at this stage is that of the normal-temperature type, since it is difficult to heat the inside sufficiently as in the aforementioned case. For example, the glue whose principal agent is ethylene-vinyl acetate copolymer water-based emulsion is suitable for piling. As an example, the following explains the special property of "EJ-6," a product of Taguchi Glue Store Co. Ltd.

Ingredients and Amounts Contained

Ethylene water: 55 to 57%

Water: 43 to 45%

Physical/Chemical Nature

Boiling point: Approximately 100° C. (liquid)

Melting point: Approximately 0° C. (liquid)

Specific gravity (20° C.): 1.00 to 1.20

Advice for Disposal: It is disposed of by burning.

(The above information is based on the product-safety data sheet (MSDS).)

A corrugated cardboard block (sample 1, dimension: 100 mm long×100 mm wide×60 mm high; weight: 180 g/m$^2$) formed by piling 12 sheets of such one-sided corrugated cardboard 19, was dipped in water and a load (5.0 kg) was applied so as to check the change in conditions over time. There were two directions of loading (compression), one being parallel to the piling direction (planar compression) and one perpendicular to the piling direction (perpendicular compression). Further, a corrugated cardboard block (sample 2) made from the aforementioned water-resistant center-core base paper and non-water-resistant glue (normal glue), a corrugated cardboard block (sample 3) made from non-water-resistant paper (strengthened core) and reinforced cornstarch glue 15, and a corrugated cardboard block (sample 4) made from non-water-resistant paper and non-water-resistant glue were checked for the changes of conditions over time, as well. The dimensions and the weight of samples 2 to 4 are all the same as sample 1.

FIGS. 4 and 5 show the changes of the conditions over time.
Sample 1 (water-resistant center-core base paper×reinforced cornstarch glue 15)

[1] Planar compression: Neither exfoliation, crushing nor significant dimensional change was detected in the pasted or piled portion until 72 hours had passed after the sample had been dipped in water. After 72 hours the top and the bottom layers of the pasted portion of the corrugated cardboard block partially began to exfoliate, but the other portions retained their original shape. However, the height of the corrugated cardboard block changed from 60 mm to within the range of 55 to 57 mm. When the sample was dried naturally, it was confirmed that there was no exfoliation. Further, the aforementioned height remained within the range of 55 to 57 mm.

[2] Perpendicular compression: Neither exfoliation, crushing nor a significant dimensional change was detected in the pasted or piled portion until 72 hours had passed after the sample was dipped in water. After 72 hours the level of exfoliation was similar to that of the planar compression, but the dimensions had not changed. When the sample was dried naturally, it was confirmed that there was no exfoliation.

Sample 2 (Water-Resistant Center-Core Base Paper×Non-Water-Resistant Glue)

[1] Planar compression: Neither exfoliation, crushing nor a significant dimensional change was detected in the pasted or piled portion until two hours had passed after the sample was dipped in water. After two hours the top and bottom layers of the pasted portion of the corrugated cardboard block exfoliated. The middle layers of the pasted portion were partially exfoliated, as well.

[2] Perpendicular compression: Neither exfoliation, crushing nor a significant dimensional change was detected in the pasted or piled portion until 16 hours had passed after the sample was dipped in water. After 16 hours the top and bottom layers of the pasted portion of the corrugated cardboard block exfoliated. The other portions retained their original shape.

Sample 3 (Non-Water-Resistant Paper×Reinforced Cornstarch Glue 15)

[1] Planar compression: After two minutes the piled portion of the upper half of the corrugated cardboard block completely exfoliated. A warp was found in the one-sided corrugated cardboard.

[2] Perpendicular compression: After 2 minutes 26 seconds almost all the piled portion exfoliated and the block collapsed. A warp was found in the one-sided corrugated cardboard.

Sample 4 (Non-Water-Resistant Paper×Non-Water-Resistant Glue)

[1] Planar compression: After two minutes the pasted or piled portion began to exfoliate. After 2 minutes 45 seconds the block collapsed. In some of the one-sided corrugated cardboards, a tier (corrugated shape) was found to be completely slack.

[2] Perpendicular compression: After five minutes the pasted or piled portion exfoliated. In some of the one-sided corrugated cardboards, a tier (corrugated shape) was found to be completely slack.

As mentioned above, the use of the water-resistant center-core base paper of this invention improves its resistance to planar compression and perpendicular compression, meaning the water-resistance, of the corrugated cardboard block at time of dipping in water. Moreover, the use of the reinforced cornstarch glue 15 in addition to the water-resistant center-core base paper further improves water-resistance, providing high water-resistance to the corrugated cardboard block of this invention.

Consequently, corrugated cardboard blocks, which were conventionally used only as buffer members, can also be used as structural members if they are water-resistant corrugated cardboard blocks. It is thereby possible to bring a high commercial value to corrugated cardboard blocks. The next section describes an example in which the water-resistant corrugated cardboard block is used as a structural member.

Figure 2:
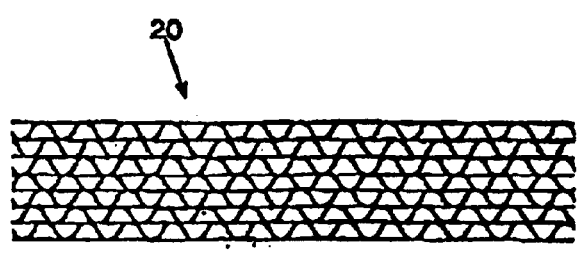
FIG. 2 is a side view showing a corrugated cardboard block made by piling seven sheets of one-sided corrugated cardboard, as mentioned above.
Figure 3A:
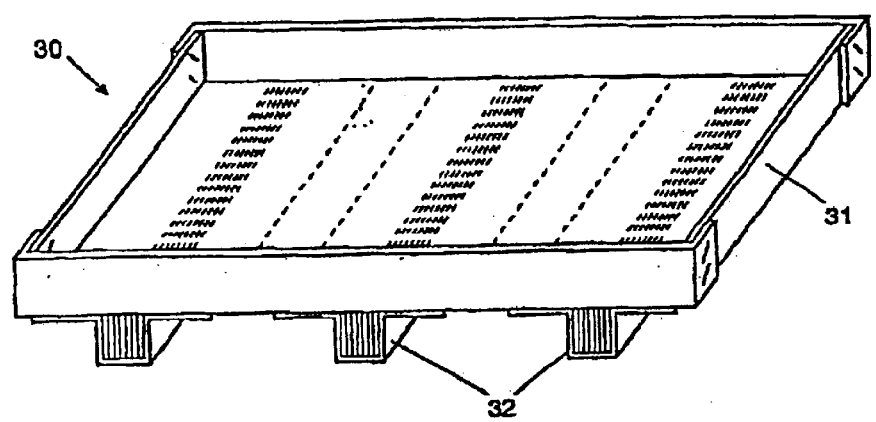
FIGS. 3a and 3b are a perspective view showing a pallet using water-resistant corrugated cardboard in the beam portion.
Figure 3B:
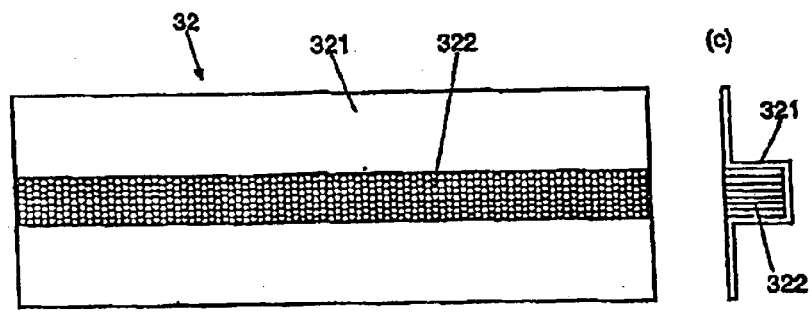

FIG. 2 shows a side view of the corrugated cardboard block 20 formed by piling seven sheets of such one-sided corrugated cardboard 19. A pallet 30 with such water-resistant corrugated cardboard blocks 20 used in the beam portion is shown in FIG. 3. The main body (i.e., the portion containing goods) 31 of the pallet 30 is made of the strengthened corrugated cardboard and the water-resistant corrugated cardboard blocks 20 of this invention are used for the interior 322 of the beam portion 32. It should be noted that the case 321 of the beam portion 32 can be made of the normal corrugated cardboard. The beam portion 32 and main body 31 are, after adhesion by hot-melt adhesive, fixed mechanically by the stitcher.

If it is instructed that the goods placed on the pallet are to be kept out of water, the pallet containing such goods is seldom exposed to rain. However, it is often the case that the floor on which the pallet is placed gets wet by water flowing from another place. Additionally, in many cases moisture or humidity can remain on the floor. For this reason, as shown in FIG. 3, even if water-resistant corrugated cardboard blocks are used only for the beam portion, it is possible to make a pallet with sufficient weather-resistance.

This pallet 30 was also dipped in water and a load (approx. 400 kg) was applied so as to check the changes in conditions over time. As a result, when the load was removed 44 hours after the pallet was dipped in water, there was no exfoliation, crushing or significant dimensional change detected in the pasted or piled portion.

Apart from such pallets, the water-resistant corrugated cardboard blocks of this invention can be used for the bases of tatami mats, for example. Since a tatami mat is an item that people step on and walk on for a long time, the base of a tatami mat requires high resistance to compression.

However, if the conventional corrugated cardboard blocks are used for the base of a tatami mat, its strength is reduced within a short period of time due to the absorption of moisture and humidity, causing the tatami mat to sink if people step or walk on it. Therefore, the tatami mat must be changed within a relatively short period, which is not economical.

The water-resistant corrugated cardboard blocks of this invention can be suitably used for the bases of tatami mats, which require high strength. This is because the blocks provide excellent water resistance and demonstrate considerable compressive strength even when dipped in water for a long time, as mentioned earlier.

Because the components of the corrugated cardboard of this invention—being both the base paper and adhesive used to glue such base paper—are water-resistant, the cardboard does not dissolve in water and its strength does not diminish significantly. Accordingly, the use of the corrugated cardboard of this invention facilitates the manufacture of all-weather pallets, containers and/or the like, which was possible in the case of the conventional corrugated cardboard. To take the cost into consideration, it is also possible to use the water-resistant corrugated cardboard of this invention for the necessary parts as described in the previous examples.

Additionally, the corrugated cardboard of this invention can be used for curing and/or the like in construction, other than as a pallet or container.

I claim:

1. A water-resistant, corrugated cardboard comprising a first ply and a second ply of water-resistant paper wherein said first ply is corrugated and said second ply is flat said plies being glued together with a first adhesive including a cornstarch glue base and 7 to 10 wt. % of a water-resistant additive, the water resistant additive comprising; (A) 20 to 30 wt. % of a first resin selected from the group consisting of: urea and melamine, (B) 30 to 40 wt. % of a modified ketone resin, and (C) 30 to 50 wt. % of water.

2. A water-resistant, corrugated cardboard pile comprising multiple piled layers of the water-resistant, corrugated cardboard as described in claim 1, wherein said layers are glued together with a second adhesive, said second adhesive including a water-based emulsion of ethylene-vinyl acetate copolymer.

3. A pallet having a beam portion, said pallet comprising multiple piled layers of the water-resistant, corrugated cardboard as described in claim 1, in at least a beam portion, wherein said layers are glued together with a second adhesive including a water-based emulsion of ethylene-vinyl acetate copolymer.

* * * * *